(12) United States Patent
Noda et al.

(10) Patent No.: US 9,231,238 B2
(45) Date of Patent: Jan. 5, 2016

(54) ELECTRIC STORAGE DEVICE

(75) Inventors: Sawako Noda, Tokyo (JP); Kunio Nakazato, Tokyo (JP); Hideo Yanagita, Tokyo (JP); Satoru Kudo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 355 days.

(21) Appl. No.: 13/039,740

(22) Filed: Mar. 3, 2011

(65) Prior Publication Data

US 2011/0236763 A1    Sep. 29, 2011

(30) Foreign Application Priority Data

Mar. 24, 2010    (JP) .................................. 2010-068150

(51) Int. Cl.
*H01M 2/16* (2006.01)
*H01M 10/052* (2010.01)
*H01M 10/0585* (2010.01)
*H01M 4/66* (2006.01)
*H01M 4/70* (2006.01)

(52) U.S. Cl.
CPC ............ *H01M 2/162* (2013.01); *H01M 10/052* (2013.01); *H01M 10/0585* (2013.01); *H01M 4/661* (2013.01); *H01M 4/70* (2013.01); *Y02E 60/122* (2013.01); *Y02T 10/7011* (2013.01)

(58) Field of Classification Search
CPC combination set(s) only.
See application file for complete search history.

(56) References Cited

U.S. PATENT DOCUMENTS

| | | | |
|---|---|---|---|
| 6,461,769 B1 | 10/2002 | Ando et al. | |
| 2002/0155347 A1* | 10/2002 | Tanaka et al. | ................. 429/144 |
| 2005/0208383 A1* | 9/2005 | Totsuka et al. | ................ 429/247 |
| 2006/0057433 A1 | 3/2006 | Ando et al. | |
| 2009/0029261 A1* | 1/2009 | Thomas-Alyea et al. | .... 429/248 |

FOREIGN PATENT DOCUMENTS

| | | | |
|---|---|---|---|
| EP | 1973188 A1 | * | 9/2008 |
| EP | 2234194 A1 | * | 9/2010 |
| JP | 3485935 B2 | | 1/2004 |
| WO | 2004/059672 A1 | | 7/2004 |

* cited by examiner

*Primary Examiner* — Ula C Ruddock
*Assistant Examiner* — Daniel Gatewood
(74) *Attorney, Agent, or Firm* — McDermott Will & Emery LLP

(57) ABSTRACT

In an electric storage device, lithium electrodes are disposed on respective outermost portions of an electrode laminated unit in which a positive electrode and a negative electrode are laminated alternately via positive/negative electrode separators. The lithium electrode includes lithium metal serving as a lithium ion supply source, and a lithium electrode separator (a non-woven fabric separator) constituted by a non-woven fabric that satisfies the following conditions: (a) an average fiber diameter of 0.1 μm to 10 μm; and (b) a thickness of 5 μm to 500 μm is provided. By forming the lithium electrode separator that contacts the lithium electrode including the lithium ion supply source from a non-woven fabric in this manner, a dramatic improvement can be achieved in the cycle characteristic of the electric storage device.

5 Claims, 4 Drawing Sheets

10: Electric storage device
12: Electrode laminated unit
13: Positive electrode
14: Negative electrode
15: Positive/negative electrode separator
16: Lithium electrode separator (non-woven fabric separator)
17: Lithium electrode
25: Lithium metal 10: Electric storage device
12: Electrode laminated unit
13: Positive electrode
14: Negative electrode
15: Positive/negative electrode separator
16: Lithium electrode separator (non-woven fabric separator)
17: Lithium electrode
25: Lithium metal

ELECTRIC STORAGE DEVICE

CROSS-REFERENCE TO RELATED APPLICATIONS

The present application claims priority from Japanese Patent Application No. 2010-068150, filed on Mar. 24, 2010, the entire contents of which are hereby incorporated by reference.

BACKGROUND OF THE INVENTION

1. Field of the Invention

The present invention relates to a technique for an electric storage device, and more particularly to a technique that is effective when applied to a lithium electrode.

2. Description of the Related Art

A lithium ion secondary battery or the like is available as an electric storage device installed in an electric automobile, a hybrid automobile, and so on (an EV and so on). To improve an energy density of the electric storage device, electric storage devices having a lithium electrode into which lithium metal is incorporated as an ion supply source have been proposed (see Japanese Patent No. 3485935 and WO 2004/059672, for example). In these electric storage devices, lithium metal is electrochemically connected to a negative electrode or a positive electrode such that lithium ions from the lithium metal are doped in advance (pre-doped). These electric storage devices are provided with the aim of achieving further improvements in capacity and other cell characteristics in order to extend a travel distance of an EV or the like.

However, when lithium ion pre-doping is performed in a lithium ion pre-doping type electric storage device, the pre-doping is not performed evenly due to variation in conditions such as an electrode surface state, a separator structure, and a cell structure, and as a result, a reliability of the device, and in particular a cycle characteristic, are adversely affected. It is therefore desirable to improve the cycle characteristic by performing pre-doping evenly.

SUMMARY OF THE INVENTION

An object of the present invention is to provide an electric storage device with which an improvement in a cycle characteristic can be achieved.

The aforesaid and other objects and novel features of the present invention will become apparent from the description provided in the specification and the attached drawings.

An outline of a representative aspect from among the aspects disclosed in the present application may be described briefly as follows.

An electric storage device according to the present invention includes: a positive electrode; a negative electrode; and a lithium electrode having a lithium ion supply source for supplying lithium ions to the positive electrode and/or the negative electrode, wherein the lithium electrode is disposed at a distance from the positive electrode or the negative electrode via a separator made of a non-woven fabric that satisfies following conditions: (a) an average fiber diameter of 0.1 μm to 10 μm; and (b) a thickness of 5 μm to 500 μm.

Effects obtained by the representative aspects from among the aspects disclosed in the present application may be described briefly as follows.

The lithium electrode is separated from the electrodes by the non-woven fabric separator satisfying predetermined conditions relating to the average fiber diameter and the thickness. Due to a superior liquid retaining property of the separator, a large amount of electrolyte is held on a lithium electrode surface and in the separator, and therefore lithium ion pre-doping can be performed evenly. As a result, the cycle characteristic of the electric storage device can be improved.

DESCRIPTION OF THE PREFERRED EMBODIMENTS

Figure 1:
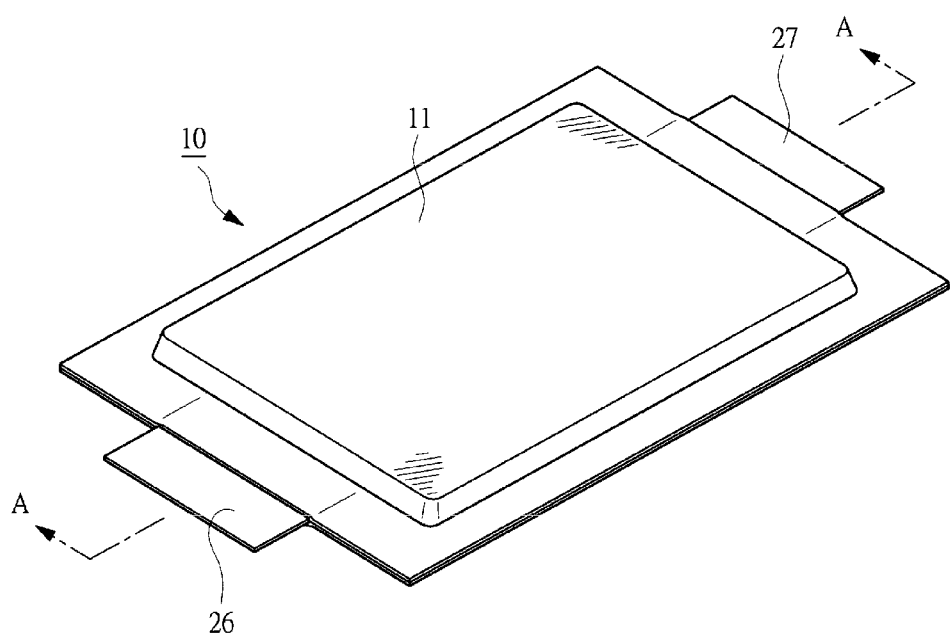
FIG. 1 is a perspective view showing an electric storage device serving as an embodiment of the present invention.

An embodiment of the present invention will be described in detail below on the basis of the drawings. Note that as a general rule, elements having identical functions have been allocated identical reference numerals in all of the drawings illustrating this embodiment, and repeated description thereof has been omitted whenever possible.

Figure 2:
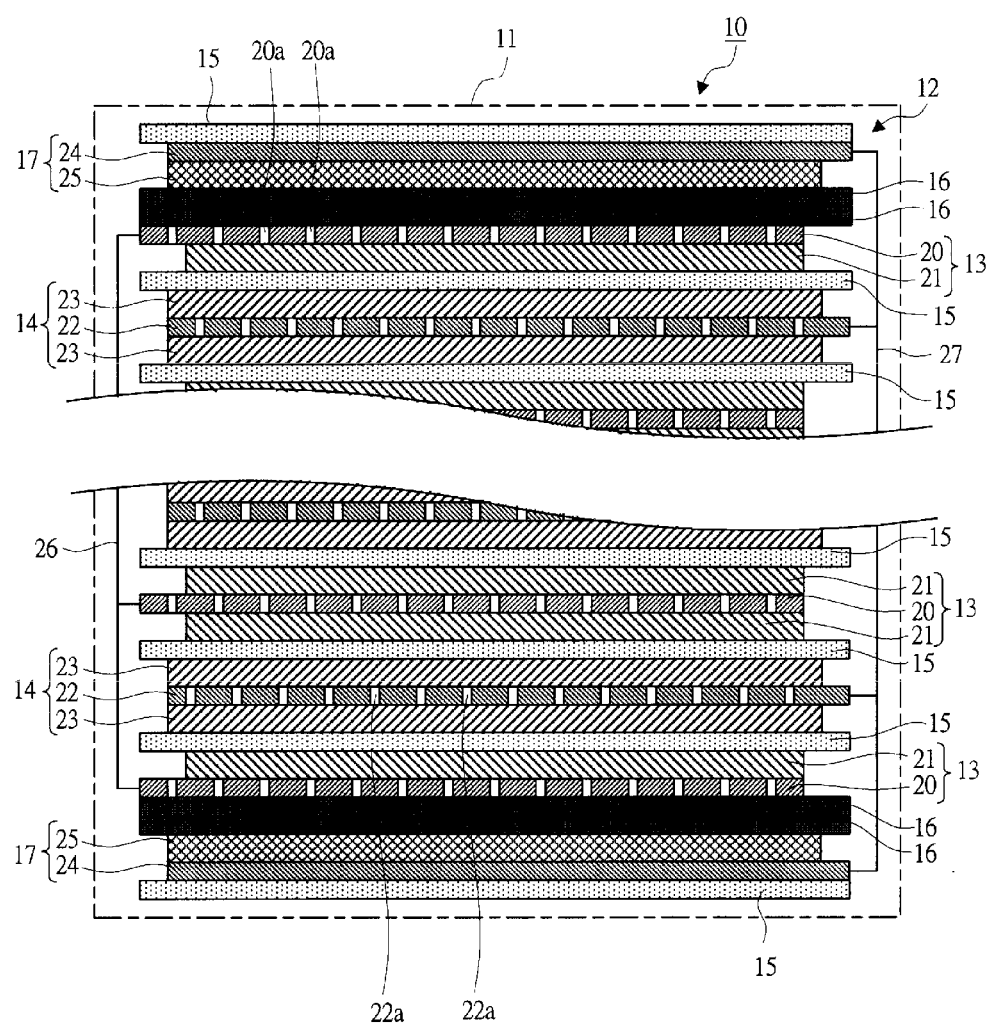
FIG. 2 is a schematic sectional view showing an internal structure of the electric storage device shown in FIG. 1 along an A-A line.

FIG. 1 is a perspective view showing an electric storage device serving as an embodiment of the present invention, and FIG. 2 is a schematic sectional view showing an internal structure of the electric storage device shown in FIG. 1 along an A-A line. As shown in FIGS. 1 and 2, an electrode laminated unit 12 is housed in an outer container 11 constituted by laminated film. In the electrode laminated unit 12, a positive electrode 13 and a negative electrode 14 are laminated alternately via positive/negative electrode separators 15 such that the positive electrode 13 is disposed on an outer side.

Lithium electrodes 17 are disposed respectively in outermost portions of the electrode laminated unit 12 so as to oppose the positive electrode 13 via two, in the illustrated example, lithium electrode separators 16 (non-woven fabric separators). In other words, the lithium electrodes 17 are disposed at a distance from the positive electrodes 13 via the lithium electrode separators 16. Note that the outer container 11 is filled with an electrolyte constituted by an aprotic polar solvent containing lithium salt.

As shown in FIG. 2, the positive electrode 13 includes an aluminum positive electrode collector 20 having a large number of through holes 20*a*. A positive electrode active material layer 21 is provided on one surface of the positive electrode collector 20 in the positive electrodes 13 on the outermost layers and on both surfaces of the positive electrode collector 20 in the other positive electrodes 13. The negative electrode 14 includes a copper negative electrode collector 22 having a large number of through holes 22*a*. A negative electrode active material layer 23 is provided on both surfaces of the negative electrode collector 22. The lithium electrode 17 includes a copper lithium, electrode collector 24. Lithium metal 25 is adhered to the lithium electrode collector 24 as a lithium ion supply source. In other words, the lithium electrode separator 16 is disposed on the lithium metal 25. Note that a positive electrode terminal 26 is connected to the positive electrode collector 20 and a negative electrode terminal 27 is connected to the negative electrode collector 22 and the lithium electrode collector 24. Further, in the example of FIG.

2, the respective collectors 20, 22, 24 are formed to project toward the terminals 26, 27 on the corresponding connection side.

In the positive electrode active material layer 21, lithium, ions and anions can be doped and dedoped reversibly to and from the positive electrode active material. In the negative electrode active material layer 23, lithium ions can be doped and dedoped reversibly to and from the negative electrode active material. Hence, the electric storage device 10 functions as a lithium, ion secondary battery. The electric storage device 10 according to the present invention is not limited to a lithium ion secondary battery, however, and may be an electric storage device of another type, such as a lithium ion capacitor or an electric double layer capacitor. Note that a lithium ion capacitor is an electric storage device that employs activated carbon, for example, as the positive electrode active material and a polyacenic organic semiconductor (PAS), for example, as the negative electrode active material.

In this specification, the term doping includes storage, support, adsorption, insertion, and so on. In other words, doping denotes a state in which anions, lithium ions, and so on enter a positive electrode active material and a negative electrode active material. The term dedoping includes release, desorption, and so on. In other words, dedoping denotes a state in which anions, lithium ions, and so on leave a positive electrode active material and a negative electrode active material.

The lithium electrode separator 16 of the electric storage device 10 is formed from a non-woven fabric that satisfies the following conditions: (a) an average fiber diameter of 0.1 μm to 10 μm; and (h) a thickness of 5 μm to 500 μm. Note that in the present invention, a non-woven fabric is a fabric whose fibers are bonded to each other, and therefore excludes woven fabric, knitted fabric, paper, and film.

A non-woven fabric having an average fiber diameter that exceeds 10 μm exhibits a poor electrolyte retaining property, making it difficult to perform lithium ion pre-doping evenly. The average fiber diameter of a non-woven fabric is normally at least 0.1 μm, and therefore the fiber diameter of the fibers constituting the non-woven fabric is preferably within a range of 0.1 μm to 10 μm. The fiber diameter can be measured by photographing an evaluation subject non-woven fabric using a scanning type electron microscope (SEM) and selecting approximately twenty fibers at random from the large number of fibers depicted on the resulting SEM image. The average fiber diameter can then be determined by calculating an average value of the measured fiber diameters, for example.

Further, a thickness of the lithium electrode separator 16 is preferably between 10 μm and 100 μm, and more preferably between 25 μm and 75 μm. When the thickness is less than 5 μm, a sufficient interval cannot be provided between the positive and negative electrodes, and therefore a short-circuit may occur. The thickness of the separator is normally within 500 μm, and from the point of view of both cost and performance, a thickness exceeding 500 μm is not desirable. The lithium electrode separator 16 may be formed such that this range is satisfied by either the thickness of a single separator or the total thickness of two or more separators, as shown in the drawing. The thickness of the separator may be measured in compliance with JIS L1086, for example.

A non-woven fabric that includes fibers constituted by a polymeric material containing a hydrophilic functional group, for example, is preferably used as the non-woven fabric of the lithium electrode separator 16 due to its favorable liquid retaining property. Favorable examples of polymeric materials containing a hydrophilic functional group include aramid, nylon, cellulose, and rayon. Aramid fibers (an aramid separator) are particularly preferable as the polymeric material fibers. An aramid separator preferably has a high proportion of aramid fibers. A gas permeability (seconds/100 cm$^3$) of the aramid separator is preferably set at 100 or less, and a polycarbonate (PC) liquid absorption rate (mm/10 minutes) is preferably set at 20 or more, for example.

The positive/negative electrode separator 15 may be formed from a different material from the material of the non-woven fabric separator used for the lithium electrode separator 16. For example, a fabric, a non-woven fabric, or a porous body made of glass fibers or polyolefin (polyethylene, polypropylene), a paper (cellulose) and so on may be used.

In the electric storage device 10, the lithium electrode separator 16 contacting the lithium electrode 17 is formed from a non-woven fabric having an average fiber diameter and a thickness that satisfy the predetermined ranges described above, and therefore a large amount of electrolyte can be held in the lithium electrode separator 16. As a result, lithium ion pre-doping can be performed evenly, enabling a dramatic improvement in a cycle characteristic of the electric storage device.

A separator satisfying the above conditions exhibits a superior liquid retaining property to a separator made of an identical polyolefin-based porous membrane to that of the positive/negative electrode separator 15. When a highly liquid-retentive separator is provided as the lithium electrode separator 16, a large amount of electrolyte is held therein, and therefore even pre-doping can be realized. As a result, a discharge capacity retention ratio of the electric storage device 10 following a predetermined number of cycles relative to an initial discharge capacity can be improved dramatically in comparison with an electric storage device in which the lithium electrode separator 16 is formed from an identical material to the material of the positive/negative electrode separator 15. The discharge capacity retention ratio, which serves as an index of the cycle characteristic, can be improved by approximately 50% over 35 to 40 cycles, for example.

Further, by providing the predetermined lithium electrode separator 16 described, above, fine particles of the lithium metal 25 are occluded into the lithium electrode separator 16 following lithium ion pre-doping and do not remain on the lithium electrode collector 24. As a result, an improvement in safety can be achieved. In other words, with an electric storage device in which the lithium electrode separator 16 is formed from the same material as the positive/negative electrode separator 15, fine particles of the metallic lithium 25 are likely to remain on the lithium electrode collector 24 following pre-doping. When these fine particles infiltrate the cell as foreign matter and move to the surface of the positive electrode or the negative electrode, an internal short-circuit may occur. Furthermore, if a cell is broken by an unintentional impact, the lithium metal may fly out into the atmosphere. With the electric storage device 10, however, these situations can be avoided.

Next, materials and so on of the respective constitutional components of the electric storage device 10 other than the separators described above will be described. A compound containing vanadium (to be referred to hereafter as a "vanadium compound") may be cited as an example of the positive electrode active material used in the positive electrode active material layer 21 of the positive electrode 13. Vanadium oxide may be cited as a favorable example of a vanadium compound. There are no particular limitations on the composition and structure of the vanadium oxide, but examples of specific vanadium oxide structures include $V_2O_5$, $MV_2O_5$, $MV_3O_8$, $MV_2O_4$, $V_6O_{13}$, and $MVO_2$ (in all cases, M denotes a cationic element). Further, compounds such as $LiVOPO_4$ and $Li_3V_2$ (XO$_4$)$_3$ (where X denotes S, P, As, Mo, W, and so on) may be cited as compounds other than vanadium oxide. Note that an element ratio need not be an integer.

Vanadium oxide can typically be obtained by a reaction with a gas, a liquid, or a solid of the constitutional elements. Examples of gaseous reactions include vapor deposition and sputtering, examples of solution reactions include a precipitation formation reaction such as a sol-gel reaction, and examples of solid reactions include an inter-solid reaction and a melting reaction such as a melt-quenching method.

Further, in the case in which the electric storage device 10 is caused to function as a lithium ion capacitor, activated carbon, a conductive polymer, a polyacenic material may be used, for example. Note that a granularity of the positive electrode active material is normally between approximately 2 μm and 20 μm at D 50%.

The positive electrode 13 can be manufactured by mixing the positive electrode active material together with a binder such as polyvinylidene difluoride (PVdF), forming the positive electrode material into a slurry using a solvent such as N-methylpyrrolidone (NMP), and coating the positive electrode collector 20 with the slurry. The coated layer is preferably formed at a thickness of 10 μm to 100 μm, for example. Further, if necessary, conductive particles may be added to the positive electrode active material. Conductive carbon such as Ketjen black, a metal such as copper, iron, silver, nickel, palladium, gold, platinum, indium, and tungsten, a conductive metal oxide such as indium oxide and tin oxide, and so on may be used for the conductive particles. The conductive particles are preferably added at a ratio of 1 to 30% of the active material weight.

A conductive substrate exhibiting conductivity on a surface that contacts the coated layer is used as the positive electrode collector 20. The conductive substrate may be formed from a conductive material such as a metal, a conductive metal oxide, and conductive carbon. Copper, gold, aluminum, an alloy thereof, or conductive carbon, for example, may be used favorably as the conductive material. Further, the positive electrode collector 20 may be formed by covering a substrate main body formed from a non-conductive material with a conductive material. Note that the negative electrode collector 22 and the lithium electrode collector 24 may be formed using similar materials. However, aluminum, stainless steel, or the like is preferably used for the positive electrode collector 20, whereas copper, stainless steel, nickel, or the like is preferably used for the negative electrode collector 22 and the lithium electrode collector 24.

The negative electrode active material layer 23 of the negative electrode 14 is obtained by mixing a typically used negative electrode active material made of a lithium-based material together with a binder to form a slurry, similarly to the positive electrode active material, and coating the collector with the slurry. Examples of the lithium-based material include an intermetallic compound material containing lithium and another metal, a lithium compound, and a lithium intercalated carbon material. Here, a lithium intercalated carbon material is a carbon material that can be infiltrated by lithium ions by breaking weak bonds between the layers of layered crystals.

Tin and silicon may be cited as examples of an intermetallic compound material. Lithium nitride may be cited as an example of a lithium compound. Graphite, a carbon-based material, a polyacenic material, and so on, for example, may be used as the lithium intercalated carbon material. A non-graphitizable carbon material and so on may be cited as examples of carbon-based materials. A PAS, which is an insoluble and infusible substrate having a polyacenic skeleton, and so on may be cited as examples of polyacenic materials. When the negative electrode 14 is formed using a lithium intercalated carbon material, lithium ions can always be reversibly doped.

A lithium-aluminum alloy or the like may be used as the lithium ion supply source of the lithium electrode 17 instead of the lithium metal 25 shown in the drawing. In other words, any material that contains at least a lithium element and can supply lithium ions may be used. Lithium ions are preferably doped at a molar ratio of 0.1 to 6 to the positive electrode active material. When the lithium ions are doped at a molar ratio of less than 0.1, a sufficient doping effect cannot be exhibited, and when the lithium ions are doped at a molar ratio of more than 6, the positive electrode active material may be reduced to a metal.

Since a decomposition voltage of water need not be taken into account, a non-aqueous electrolyte solution by dissolving an electrolyte in a non-aqueous solvent can be used favorably as the electrolyte solution.

Lithium salts such as $CF_3SO_3Li$, $C_4F_9SO_8Li$, $(CF_3SO_2)_2NLi$, $(CF_3SO_2)_3CLi$, $LiBF_4$, $LiPF_6$, and $LiClO_4$, or VC (vinylene carbonate), for example, may be used as the electrolyte.

Examples of non-aqueous solvents include electrolyte solutions such as chain carbonate, cyclic carbonate, cyclic ester, a nitrile compound, an acid anhydride, an amide compound, a phosphate compound, and an amine compound.

Specific examples of non-aqueous solvents include ethylene carbonate (EC), diethyl carbonate (DEC), propylene carbonate, dimethoxyethane, γ-butyrolactone, n-methylpyrrolidinone, N,N'-dimethylacetamide, and acetonitrile. Further, a mixture of propylene carbonate and dimethoxyethane, a mixture of sulfolane and tetrahydrofuran, and so on may be used.

Various materials typically employed in batteries may be used for the outer container. For example, a metallic material such as iron and aluminum may be used, and a film material made of resin or the like may be used. There are no particular limitations on the shape of the outer container, and a cylindrical shape, an angular shape, and so on may be selected appropriately in accordance with the application. To achieve reductions in the size and weight of the electric storage device, a film-form outer container using aluminum laminated film is preferably employed as the outer container.

The present invention was described in detail above on the basis of the drawings, but the present invention is not limited to the above embodiment and may be subjected to various modifications within a scope that does not depart from the spirit thereof.

In the electric storage device 10, the positive electrode 13 and the negative electrode 14 are laminated alternately such that the positive electrode 13 is disposed on the outer side, but the negative electrode 14 may be disposed on the outer side.

The present invention will now be described further using examples. Note that the present invention is not limited to these examples.

EXAMPLES

Manufacture of Positive Electrode

A positive electrode active material $V_2O_5$ was synthesized to have an initial discharge capacity of 340 mAh and a granularity (D50) of 3.3 μm. This positive electrode active material was mixed together with 3% by weight of PVdF used as a binder and 2% by weight of Ketjen black used as conductive particles, whereupon a slurry was formed using N-methylpyrrolidone (NMP) as a solvent. The slurry was then applied to porous Al foil serving as a positive electrode collector using a doctor blade method. After applying the slurry evenly up to a mixture material density per surface of 2 g/cm$^3$, the resulting component was molded and then cut into a 126 mm×97 mm square. Thus, a positive electrode was obtained.

(Manufacture of Negative Electrode)

Graphite and PVdF serving as a binder were mixed at a weight ratio of 97:3, whereupon a slurry was prepared using NMP. A component obtained by applying the slurry evenly to both surfaces of a copper collector having through holes, which served as a negative electrode collector, up to a mixture material density per surface of 1.5 g/cm$^3$ was molded and then cut into a 129 mm×100 mm square. Thus, a negative electrode was obtained.

(Manufacture of Lithium Electrode)

A copper collector serving as a lithium electrode collector was cut to an identical size to the negative electrode. A lithium metal was then adhered thereto to obtain a lithium electrode.

(Manufacture of Electrode Laminated Unit)

Six positive electrodes (two of which were coated on only one surface) and five negative electrodes manufactured as described above were laminated via polyolefin-based porous membranes serving as positive/negative electrode separators. Further, the lithium electrodes were disposed on the outermost layers via two non-woven fabric separators containing aramid fibers and serving as lithium electrode separators. As a result, an electrode laminated unit constituted by positive electrodes, negative electrodes, lithium electrodes, and separators was manufactured.

(Evaluation of Properties of Lithium Electrode Separator)

When the average fiber diameter of the two non-woven fabric separators used to manufacture the electrode laminated unit was measured by photographing the separators using an SEM and selecting twenty fibers at random from the large number of fibers depicted on a resulting SEM image, the average fiber diameter was no more than 10 μm. In other words, the average fiber diameter of the fibers constituting the non-woven fabric separators was estimated to be 10 μm or less. Further, the thickness of the respective non-woven fabric separators was 25 μm in all cases when measured in compliance with JIS L1086.

(Manufacture of Battery)

The manufactured electrode laminated unit was packaged using aluminum laminated film. An electrolyte solution obtained by dissolving 1.5 mol/L of LiPF$_6$ into ethylene carbonate (EC):dimethyl carbonate (DMC):methylethyl carbonate (NEC)=1:1:1 (weight ratio) was then charged into the resulting component. As a result, a lithium ion secondary battery serving as the electric storage device 10 shown in FIGS. 1 and 2 was assembled.

(Evaluation of Cycle Characteristic)

The manufactured lithium ion secondary battery was left for nine days, whereupon a single cell was disassembled. It was found that the lithium metal had completely disappeared, and it was thereby confirmed that a required amount of lithium ions had been occluded so as to be supported on the negative electrode or the positive electrode, or in other words that the lithium ions had been pre-doped.

Using a single cell of the manufactured lithium ion secondary battery, the initial discharge capacity (mAh/g of active material) per active material was measured at 25° C. and 0.1 C discharge. The measurement result was 340 mAh/g. Next, the battery was subjected to 40 charging/discharging cycles between 3.9 V and 2.2 V. When the discharge capacity retention ratio (the ratio (%) relative to the initial discharge capacity) was measured for each cycle, the results shown on the graph in FIG. 3 were obtained.

(Evaluation of Load Characteristic)

Figure 4:
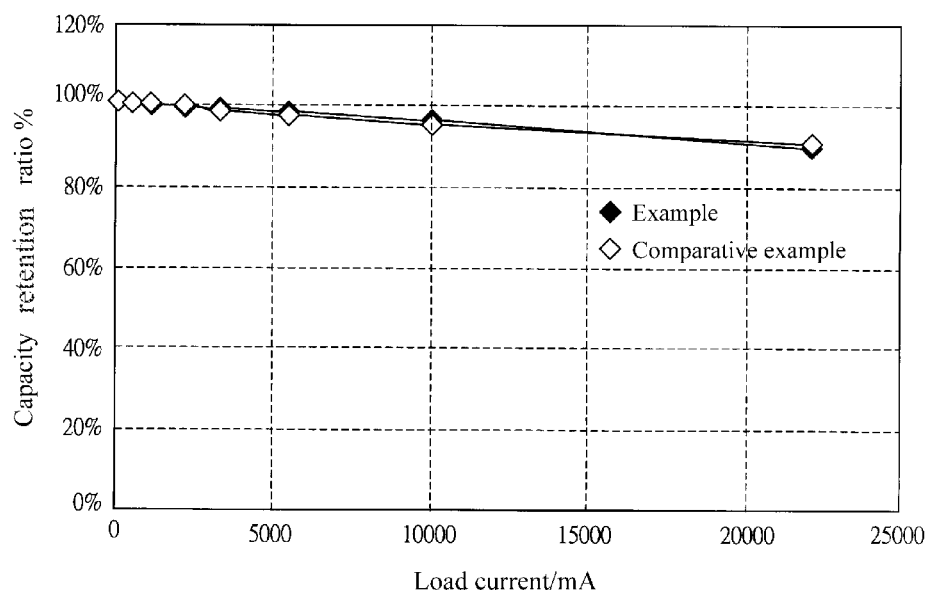
FIG. 4 is a graph showing evaluation results of a load characteristic.

Using the single cell battery described above, the discharge capacity (mAh/cell) at discharge current loads of 0.01 C, 0.05 C, 0.1 C, 0.2 C, 0.3 C, 0.5 C, 1.0 C and 2.0 C was measured. Values expressing the respective discharge capacity values as a percentage of the 0.01 C discharge capacity value were set as a capacity retention ratio, and the load characteristic (charge/discharge characteristic) was evaluated from these values. The results are shown in FIG. 4.

Comparative Example

Figure 3:
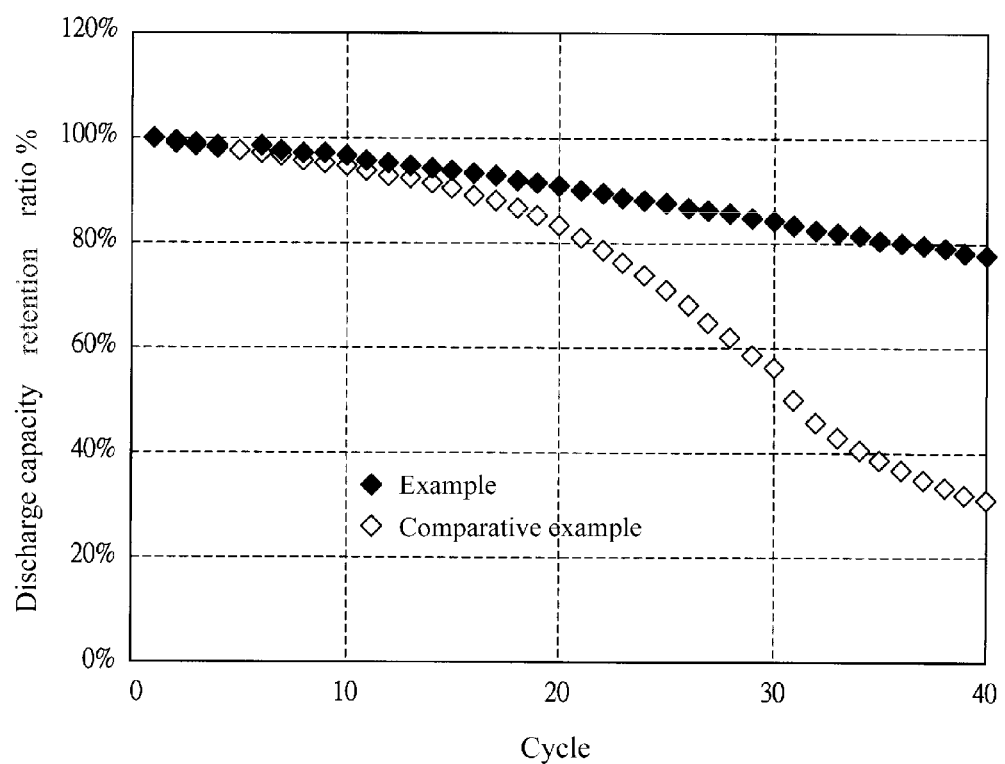
FIG. 3 is a graph showing evaluation results of a cycle characteristic.

An electrode laminated unit was manufactured in a similar manner to the example except that an identical polyolefin-based porous membrane to that of the positive/negative electrode separator was used as the lithium electrode separator. Thus, a lithium ion secondary battery was obtained. The thickness of the lithium electrode separator was measured in a similar manner to the example, and a thickness of 25 μm was obtained. Further, the cycle characteristic and load characteristic of the obtained lithium ion secondary battery were evaluated in a similar manner to the example, and the results are shown in FIGS. 3 and 4. Note that a polyolefin-based porous membrane does not correspond to a non-woven fabric.

As is evident from the results shown in FIG. 3, with the lithium ion secondary battery according to the example, an improvement of approximately 50% was obtained in relation to the discharge capacity retention ratio following 40 charge/discharge cycles in comparison with the lithium ion secondary battery according to the comparative example, and therefore the improvement in the cycle characteristic was found to be extremely large. The reason for the dramatic improvement in the cycle characteristic is thought to be the superior liquid retaining property of the non-woven fabric separator used as the lithium electrode separator in the example. In other words, it is believed that due to the superior liquid retaining property, a large amount of electrolyte solution can be held around the lithium electrode during lithium ion pre-doping, and therefore the pre-doping can be performed evenly, leading to a dramatic improvement in the cycle characteristic.

Further, it can be seen from the results in FIG. 4 that the lithium ion secondary battery according to the example maintained an equivalent load characteristic to that of the comparative example, and thus the pre-existing load characteristic was not affected even when the lithium electrode separator was changed to a non-woven fabric separator. Note that in FIG. 4, the example and the comparative example have substantially identical values, and therefore the most of the plotted points, thereof overlap.

The present invention can be used effectively in the field of electric storage devices.

What is claimed is:

1. An electric storage device comprising:
   a positive electrode;
   a negative electrode;
   a separator facing the negative electrode which is formed of one material; and
   a lithium electrode having a lithium ion supply source for supplying lithium ions to the positive electrode and/or the negative electrode,
   wherein the lithium electrode is disposed at a distance from the positive electrode or the negative electrode via a lithium electrode separator made of a non-woven fabric that satisfies following conditions: (a) an average fiber diameter of 0.1 μm to 10 μm; (b) a thickness of 5 μm to 500 μm; (c) a gas permeability (seconds/100 cm3) of 100 or less; and (d) a polycarbonate liquid absorption rate (mm/10 minutes) of 20 or more;
wherein the non-woven fabric includes aramid fibers; and
wherein the separator facing the negative electrode formed of one material is of a different material than the lithium electrode separator facing the lithium electrode.

2. The electric storage device according to claim 1, wherein the lithium electrode separator is disposed on the lithium ion supply source.

3. The electric storage device according to claim 1, wherein the non-woven fabric includes fibers constituted by another polymeric material containing a hydrophilic functional group.

4. The electric storage device according to claim 3, wherein the electric storage device is a lithium ion secondary battery.

5. The electric storage device according to claim 1, wherein the separator facing the negative electrode is formed of a polyolefin-based porous membrane.

* * * * *